United States Patent Office 3,165,503
Patented Jan. 12, 1965

3,165,503
METHOD OF POLYMERIZING BUTADIENE-1,3
HYDROCARBONS
Henry Kahn, Grafton, and Samuel E. Horne, Jr., Akron, Ohio, assignors to Goodrich-Gulf Chemicals, Inc., Cleveland, Ohio, a corporation of Delaware
No Drawing. Filed Apr. 7, 1959, Ser. No. 804,563
3 Claims. (Cl. 260—94.3)

The present invention relates generally to the polymerization of butadiene-1,3 hydrocarbons. More specifically, the invention relates to the polymerization of isoprene to produce high cis-1,4 polyisoprenes of superior properties by virtue of low gel content and a materially higher molecular weight.

In the copending application of S. E. Horne, Jr., Serial No. 472,786, filed December 2, 1954, now United States Patent No. 3,114,743, there is disclosed a method for converting isoprene to an essentially all cis-1,4 polyisoprene (i.e., in which at least 90% of the isoprene units are united cis-1,4) utilizing a titanium tetrahalide/trialkyl aluminum catalyst. Such a catalyst functions quite well in benzene hydrocarbons producing polymers of low to moderate (i.e., up to 30%) gel content and low to moderate molecular weight (DSV up to about 3.0). In aliphatic hydrocarbons, however, the product may contain up to about 45% gel and the molecular weight is also moderate. In either case, the polymerization reaction is sluggish and very high catalyst levels are required for reaction rates of 5 to 10%/hour.

It would be highly desirable to provide a method which is capable of functioning at good rates in any hydrocarbon medium to produce polymers low in gel and high in molecular weight.

In copending application, Serial No. 781,428, filed December 19, 1958, and now abandoned, H. Kahn discloses a non-polymerizable ether as a modifier used in conjunction with titanium tetrahalide/trihydrocarbon aluminum catalyst whereby cis-1,4 polyisoprenes quite low in gel content and high in molecular weight are produced. While some of the non-polymerizable ether modifiers have small effects on reaction rates, nevertheless it is generally not possible to obtain rapid reactions to high conversions while utilizing sufficient ether to obtain low gel polymer.

In accordance with the present invention it has been found that titanium tetrahalide/trihydrocarbon aluminum catalysts in the polymerization of butadiene-1,3 hydrocarbons are strongly activated (i.e., reaction rate is higher) by the addition of an amine, gel in the polymer is reduced and residual gel is much more highly swollen, and the molecular weight of the polymer is shifted only moderately up or down. The use of an amine in this manner results in a combined activator/modifier action which results in very significant improvements in process economy and polymer properties. When an amine is utilized in combination with an ether modifier of the type described in copending application, Serial No. 781,428, mentioned above, a novel synergistic action takes place with the best features of the ether (strong gel suppression, marked increase in molecular weight) and of the amine (rate activation) combining to produce a polymerization reaction that proceeds vigorously at high rates to essentially complete conversion producing polymers having very materially increased molecular weights (i.e., DSV above 3) and sharply reduced gel contents (i.e., below 25%). These results are obtained without deleterious effect on the stereospecific structure of the polymeric products; in some cases the amine seeming to favor the cis-1,4 structure.

Any amine may be utilized for this purpose including simple primary, secondary, and tertiary alkyl amines such as methyl amine, dimethyl amine, trimethyl amine, diethyl amine, triethyl amine, tripropyl amine, triallyl amine, butyl amine, dibutyl amine, tri-n-butyl amine, triisobutyl amine, triamyl amine, trihexyl amine, triheptyl amine, trioctyl amine, trilauryl amine, and others in which each alkyl group preferably contains up to about 18 carbon atoms; primary, secondary and tertiary aryl, aralkyl and alkaryl amines such as phenyl amine, diphenyl amine, triphenyl amine, phenyl-beta-naphthylamine, N-methyl aniline, N,N-dimethyl-aniline, tribenzylamine, tritolyl amine and many others; alicyclic amines such as cyclohexylamine and others; and heterocyclic amines such as pyridine, N-ethyl-piperidine, pyrrole, N-methyl pyrrolidine, N-hexyl pyrrolidine, triethyl imine, and many others.

Preferred amines most preferred are the tertiary amines (free of active hydrogen atoms), are the simpler, lower molecular weight amines since less of these need be utilized, they appear more effective, and these simpler amines are more readily available in pure forms. Thus, it is preferred to utilize aliphatic amines in which each alkyl hydrocarbon group contains from 2 to about 12 carbon atoms. Most preferred are the trialkyl amines in which each alkyl group preferably contains from 3 to about 12 carbon atoms; this latter class being preferred because they are not volatile, they have the strongest rate activating effects, they also most strongly reduce gel, they effect the greatest increase in the swelling index of the residual gel, and they have the least effect on final conversion. While the amine and/or ether have been labelled "modifiers," these substances differ from mercaptan modifiers utilized in free radical polymerization in that the amine and ether do not decrease molecular weights as do the mercaptans, rather the former function to increase molecular weight.

The amine activators are utilized with catalysts which are made by combining, as two essential ingredients, (1) a titanium tetrahalide with (2) a trihydrocarbon aluminum (i.e., an aluminum compound in which three hydrocarbon radicals per molecule are directly attached to the aluminum atom, each by means of a carbon-aluminum bond. Minor proportions, i.e., less than 20 mole percent of the total aluminum in the catalyst) of one or more other hydrocarbon aluminum compounds, for example $R_{3-n}AlX_n$ compounds, may be utilized. In the above formula, R represents a hydrocarbon radical or a hydrogen atom, but not more than two hydrogens per molecule can be present; X represents a non-hydrocarbon substituent such as hydrogen, hydroxyl, halogen, oxyhalide alkoxy, carboxy, and others; and $n$ represents an average number from 0.5 to about 2.5. Thus, compounds which are utilized in producing these catalysts include, trimethyl aluminum triethyl aluminum, tripropyl aluminum, tri-n-butyl aluminum, trioctyl aluminum, tridodecyl aluminum, trihexodecyl aluminum, triphenyl aluminum, tristyryl aluminum, dimethyl aluminum chloride, diethyl aluminum bromide, diisobutyl aluminum fluoride, diisobutyl aluminum hydride, diisobutyl aluminum isobutoxide, diisobutyl aluminum acetylacetonate, methyl aluminum dichloride, ethyl aluminum dibromide, isobutyl aluminum difluoride, the so-called sesquihalides composed of approximately equimolar proportions of monoalkyl and dialkyl aluminum halides such as methyl aluminum sesquichloride, ethyl aluminum sesquibromide, etc., mixtures of alkyl aluminum halides wherein the halide:alkyl ratio is between about 1:5 to about 5:1 (i.e., $n$ values in the formula above between about 0.5 and about 2.5).

Greatly preferred are the trialkyl aluminums low (i.e., below 5 mol percent) in aluminum hydride content such as trimethyl aluminum, triethyl aluminum, tripropyl aluminum, tri-n-butyl aluminum, triisobutyl aluminum, trioctyl aluminum, tri-(2-ethylhexyl) aluminum, tridodecyl aluminum, and others.

The titanium tetrahalide ingredient utilized in preparing the amine-activated catalysts may be titanium tetrachloride, titanium tetrabromide, titanium tetraiodide or titanium tetrafluoride. The tetrachloride and tetrabromide are similar in activity whereas the iodide and fluoride sometimes produce less active (slower) catalysts. The tetraiodide, under mild conditions, will produce a completely soluble (homogenous) catalyst. The tetrafluoride is highly insoluble in hydrocarbons yet can be utilized to produce active catalysts if allowed to stand in contact with the hydrocarbon aluminum compound or when ground in the presence of a hydrocarbon aluminum compound, in both cases it being presumed that solution of some of the insoluble salt occurs or the latter is complexed or chemically reacted to form a soluble (catalytically-active) material. Of the tetrahalides, the hydrocarbon-soluble titanium tetrachloride, titanium tetrabromide and titanium tetraiodide are preferred, the first two because of their greater vigor and specificity for isoprene, and the tetraiodide because it forms homogeneous catalysts especially applicable to the polymerization of butadiene-1,3 to form all cis-1,4 polybutadienes.

The catlayst ingredients defined above are combined to produce the catalyst. It is generally most convenient to combine the catalyst ingredients, together with the amine activator, in an inert solvent or diluent medium which may also contain the monomer to be polymerized. Greatly preferred procedures for producing a catalyst for the production of all cis-1,4 polyisoprenes involve adding the aluminum compound to the diluent and/or monomer followed by the amine and/or monomer, and lastly the titanium tetrahalide. By this procedure the aluminum compound is greatly diluted before contact with the titanium compound and the heat sometimes accompanying catalyst formation is more easily dissipated and a finer and more uniformly-dispersed catalyst is formed with which a polymerization reaction of more predictable character is obtained. Also, the aluminum compound and amine are allowed to equilibrate before addition of the titanium compound. Another procedure which gives strong modifier action involves adding the amine, then the aluminum and the remaining ingredient in any order. The two preferred procedures thus involve contact of the amine and the aluminum compound before contact is had with the titanium ingredient. The order of mixing will be referred to in connection with the discussion of Ti/Al molar ratio presented below. The catalyst-activator may be premixed and added to a diluent/monomer solution as required. Still other procedures may be utilized. The catalyst should be prepared and utilized under an inert atmosphere such as nitrogen, helium, argon and hydrocarbon vapors.

The solvent or diluent referred to above may be any inert hydrocarbon material which is liquid or which may be liquified at the desired operating temperatures. Such a medium should be inert, that is it should be low in substances capable of reacting with, complexing with, or otherwise combining with the catalyst and catlayst-forming ingredients, or monomer. Preferred inert materials are the aliphatic, aromatic and cycloaliphatic hydrocarbons which are low in oxygen, water and active hydrogen containing compounds such as alcohols, acids, and acetylenic hydrocarbons. Preferred solvents are the simple (i.e., up to 9 carbons per molecule) aromatic hydrocarbons and the more volatile (i.e., boiling below about 150° C.) aliphatic hydrocarbons containing 3 or more carbon atoms per molecule such as propane, n-butane, isobutane, pentane, butene-1, butene-2, hexane, heptane, isooctane, and the like. Most preferred are aliphatic hydrocarbons and mixtures thereof boiling in the range −10 to +50° C. at pressures below about 100 lbs./sq. in. Examples of the latter are n-butane, isobutane, butene-1, butene-2, pentane, and mixtures of these and/other hydrocarbons. The diluent increases the fluidity of the reaction mixtures. For practical operating viscosities, it is generally preferred to operate with at least 50%/wt. of the total mixture as diluent. Better yet, the diluent should be 70 to 95%/wt. of the mixture (i.e., the monomer concentration constituting from about 5 to 30%/wt.).

The reaction can be carried out at any temperature between about −70° and 80° C. More preferred are reaction temperatures from −10° to 70° C. The lower temperatures require more catalyst but seem to favor higher molecular weight and more regular polymer structure whereas higher temperatures favor faster reactions and require less catalyst but make it difficult to obtain high molecular weight without reducing catalyst levels to the point where high purity of solvent and monomer and great care become necessary to obtain reproducibility. For this reason, it is preferred to utilize reaction temperatures between about −10° and 70° C., most preferably −10° to 60° C.

Other variations in procedure which may be utilized include operation in a batchwise or continuous fashion with periodic or continuous addition of solvent, preformed catalyst and/or amine, and amine and/or catalyst-forming ingredients.

The catalysts which are activated by the amine activator are prepared by combining from about 1 to about 10 moles of a titanium tetrahalide with from about 10 to about 1 mole of a hydrocarbon aluminum. When it is desired to produce diene polymers of a given stereospecific structure, then the molar ratio Ti/Al must be more closely restricted. For example, when it is desired to produce all cis-1,4 polyisoprene (a homopolymer of isoprene in which 90% or more of the isoprene units are united head-to-head cis-1,4), the Ti/Al molar ratio of a titanium tetrachloride/trialkyl aluminum catalyst or a titanium tetrabromide/trialkyl aluminum catalyst should be between about 0.5:1 and about 1.5:1. Within the latter range, as the Ti/Al ratio is increased, the reaction rate decreases but high conversions are obtained with extended reaction times. Other variations are noted with changing Ti/Al molar catalyst ratio such as variations in gel content, molecular weight, and the like. Consequently, it is usually desired to utilize a catalyst ratio between about 0.75:1 and 1:1, most preferably from about 0.80:1 to 0.95:1, the use of the amine permitting the use of higher ratios without increases in gel content and without the reaction dying off. Where an essentially all trans-1,4 (i.e., at least 90% trans-1,4) polyisoprene is desired, catalysts of Ti:Al ratios between about 1.5:1 and 3:1 should be utilized. However, the presence of varying amounts of water, alcohol and other impurities sometimes is manifested by the polymerization reaction proceeding as if a shift in Ti/Al ratio has occurred. With an order of mixing in which the aluminum ingredient is added to the titanium or the mixing carried out without diluent also will cause an apparent shift in catalyst ratio (i.e., as if a different ratio has been charged). Adjustment to the catalyst ratio as charged will usually compensate for variations of this kind. The homogeneous catalysts prepared from titanium tetraiodide are more sensitive to Ti/Al ratio, ratios between about 1:2 and 1:7 being most desirable for the polymerization of butadiene-1,3.

The total proportion of catalyst (total of all ingredients, except amine and/or ether) can be varied considerably depending largely on the purity of solvents, diluents and monomers. As little as about 0.1% to 0.2% by weight based on the monomers can effect polymerization when special care is exercised in drying the reactor and drying and purifying solvents and monomers. In general, from about 0.2 to 10% by weight of total catalyst, based on the monomers, will be sufficient. A better way of expressing catalyst concentration is in terms of millimoles (gram millimoles) of each ingredient per liter of reaction mixture. On this basis, from about 0.5 to 50 millimoles each of the titanium and aluminum ingredients per liter of mixture may be utilized. More preferred is the range of from about 1 to about 20 millimoles of each ingredient per liter.

It is to be understood that the above ranges of proportions are to be utilized with Ti/Al molar ratios as described above.

The proportion of amine required for use in this invention can be varied to a considerable extent, depending on the results desired. In general, the proportion of amine found beneficial is quite small. As little as about 0.01 mole of amine for every mole of aluminum in the catalyst will manifest itself by an increase in the vigor of the polymerization reaction. As the proportion of amine is increased, increased reaction rates, reduced gel contents and higher polymer molecular weights are observed up to about 0.5 to 1.0 mole per mole of aluminum in the catalyst. However, in the range of about 0.75 to 1.5 moles/mole of aluminum it is sometimes observed that the polymerization reaction starts out quite rapidly, and after a vigorous initial period, the rate will tend to fall to a much lower rate. Beyond 1.5 moles/mole of aluminum it becomes difficult to achieve an economical yield of product. A reaction which starts out vigorously can be useful in a process carried out in a continuous manner to yield low conversion polymers. It is preferred, however, to utilize between about 0.05 and about 0.75 mole of amine/mole of aluminum. By suitable selection of catalyst ratio and proportion of amine, reactions complete in 30 to 60 minutes have been obtained.

Where the amine is utilized with an ether modifier, in which case the ether is relied on as the principal modifier reducing gel and increasing molecular weight, smaller proportions of amine may be utilized. For this purpose, from about 0.03 to about 0.5 mole of amine/mole of aluminum in the catalyst usually will be sufficient.

The proportion of non-polymerizable ether modifier, when utilized in conjunction with an amine activator, is also quite small. In general, from as little as about 0.0001 to 0.001 mole of ether per mole of aluminum in the catalyst can be detected by way of decreased gel contents and increased molecular weights. As the proportion of ether is increased, greater modification (i.e., lowered gel, increased molecular weight) is obtained. At about 0.3 mole of ether per mole of aluminum, significant retardation of the reaction is observed in some cases and it is not always possible to obtain practical reaction rates above about 0.8 mole of ether per mole of aluminum in the catalyst. Since the amine has a strong activating effect, proportions of ether between about 0.02 and about 0.7 mole of ether per mole of aluminum usually will be sufficient. As in the case of the amine, best results with the ether modifier are obtained when the ether is combined with the aluminum compound before the latter is combined with the titanium constituent.

The ether modifier should be non-polymerizable (i.e., free of 1-olefinic $CH_2=C<$ type structure). Illustrative ethers which may be utilized include the aliphatic ethers, the aromatic ethers, the mixed aliphatic-aromatic ethers, and also the various types of cyclic ethers. Thus, there may be utilized aliphatic ethers such as dimethyl ether, diethyl ether, dipropyl ether, di-n-butyl ether, methyl-n-butyl ether, diisoamyl ether, di-n-hexyl ether, di-(chloromethyl) ether, di-(beta-chloroethyl) diphenyl ether, diphenyl ether, anisole, styrene oxide, butadiene monoxide, furan, tetrahydrofuran, ethylene oxide and its condensates, and many, many others.

Most preferred ethers for use as modifiers are the high molecular weight condensed ethylene oxides prepared by co-condensing ethylene oxide with an active-hydrogen compound such as a phenol, an alcohol, a carboxylic acid, or a primary or secondary amine to produce a condensate having a molecular weight above about 400, more preferably above about 700. Such condensates have materially reduced retarding effects, yet have pronounced modifying effects. Commercially available materials known as "Igepal," which are condensates of an alkyl-phenol such as monyl-phenol with ethylene oxide, sold by General Aniline and Film Corporation, in molecular weights of 400 to 1500 or higher have been found to be useful in this invention.

The process of this invention is applicable to the polymerization of butadiene-1,3 hydrocarbons including butadiene-1,3 itself, isoprene (2-methyl-butadiene-1,3), piperylene (4-methyl-butadiene-1,3 or 1,3-pentadiene), 2-ethyl-butadiene-1,3, 2,3-dimethyl-butadiene-1,3, 2-phenyl-butadiene-1,3, 2,3-diphenyl-butadiene-1,3, 4-methyl-hexadiene-1,3, 2,4-dimethyl-pentadiene-1,3, 2-amyl-butadiene-1,3, 2-neopentyl-butadiene-1,3, and others.

Because of their ready availability, lower cost, ready polymerizability (with these catalysts), and the superiority of their polymers produced by this method, a preferred class of monomers is the butadiene-1,3 hydrocarbons having not more than one hydrocarbon substituent group of not more than six carbon atoms and that single substituent located on the number two carbon atom, in other words, butadiene-1,3 itself and its simple 2-substituted derivatives such as isoprene, 2-ethyl-butadiene-1,3, 2-phenyl-butadiene-1,3, 2-propyl-butadiene-1,3, 2-butyl-butadiene-1,3, 2-amyl-butadiene-1,3, 2-neopentyl-butadiene-1,3, 2-hexyl-butadiene-1,3, and others. The preferred monomers just referred to have the structure $$CH_2=\overset{R}{C}-\overset{H}{C}=CH_2$$

wherein R is selected from the group consisting of hydrogen atoms and hydrocarbon radicals containing from 1 to 6 carbon atoms. Of these, isoprene is most strongly preferred because it can be converted to all cis-1,4 homopolymers of high molecular weight which essentially duplicate hevea rubber in its structure and principal properties.

The method of this invention is also applicable to the preparation of copolymers if one or more of the above-defined butadiene-1,3 hydrocarbons with one or more monoolefins and/or non-conjugated polyolefins containing at least one $$CH_2=C<$$

group per molecule. As preferred monoolefins are the 1-olefins containing 3 or more carbon atoms per molecule such as propylene, 1-butene, isobutylene, 1-pentene, 1-hexene, 1-octene, styrene, vinyl cyclohexene and others. In these copolymers the proportion of butadiene-1,3 hydrocarbon monomer can vary between about 1 and 99%/wt. More preferred, are the copolymers containing from about 1 to about 50% by weight of the butadiene-1,3 hydrocarbon monomer.

The reaction mixture is prepared with care being exercised to preserve an inert atmosphere over the air-sensitive materials at all times until the polymerization reaction has proceeded to the point desired and the catalyst has been rendered inactive by treatment with sufficient of a catalyst killer such as an alcohol, acetone, a carboxylic acid, deoxygenated water, metal complexing agents, amines (gross amounts), and other active hydrogen containing substances capable of destroying catalyst activity and de-sensitizing the mixture to oxygen. Contact with oxygen in the presence of active catalyst degrades the unsaturated diene polymer. The step of killing or "shortstopping" the catalyst usually is carried out by adding an excess of the reagent to the reaction mixture under an inert atmosphere.

The inactivated reaction mixture may then be exposed to the atmosphere, if desired, and treated further to separate the polymeric product from the residual unreacted monomers, if any, solvent or diluent, and catalyst residues. Where a polymer soluble in the diluent medium is obtained, the reaction mixture can be subjected to alcohol, acetone or water treatments to simultaneously kill the catalyst and extract the catalyst residues. If sufficient alcohol or acetone is utilized in the latter procedure, precipitation of dissolved polymer will usually occur contemporaneously. When the catalyst has been removed, the remaining mixture can be distilled in the presence of water to effect deposition of the polymer as a crumb suspended in water. An antioxidant usually is worked into the polymer at a stage prior to the final drying operation. Drying of the polymer at temperatures up to 100° C. can be effected in an air or vacuum oven.

The invention will now be described in greater detail in the following examples, which are intended as illustrative only.

*Example I*

Isoprene is treated with finely-divided metallic sodium, then with molecular sieves and flash distilled just before use in a polymerization conducted with tri-n-butyl amine activator, the reaction mix containing the following materials:

| Material | Experiment No., Parts/Wt. | | | |
|---|---|---|---|---|
| | 1 | 2 | 3 | 4 |
| Isoprene | 100 | 100 | 100 | 100 |
| n-Butane [1] | 525 | 525 | 525 | 525 |
| Triisobutyl aluminum | 3.25 | 3.25 | 3.25 | 3.25 |
| Tri-n-butyl amine | 0 | 0.20 | 0.30 | 0.40 |
| Titanium tetrachloride | 2.80 | 2.80 | 2.80 | 2.80 |
| Ti/Al ratio | 0.9:1 | 0.9:1 | 0.9:1 | 0.9:1 |

[1] "Pure grade" treated with molecular sieves.

In each case, the reaction vessel is carefully dried and thoroughly purged with dry nitrogen, the n-butane added, then the aluminum compound and the amine, the mixture stirred for a while, and lastly the titanium compound and isoprene are added to the nitrogen-filled reaction vessel. The reaction begins very shortly in the amine-activated experiments, as evidenced by the appearance of butane reflux in a condenser connected with the reaction vessel. The control Experiment No. 1, however, shows no life for about an hour after charging, then the reaction starts and builds up to a steady average rate of about 10%/hr. which is maintained to essential completion (at 90+% or higher conversion) in about 20 hours at a temperature of 1 to 2° C. Experiments 2 to 4, however, not only start off in a matter of minutes but progress so rapidly that the average reaction rate is 80%/hr. The data are summarized below:

| | Tri-n-butyl amine, parts/100 isoprene | Average Reaction Rate, Percent/hr. | ML | Percent gel | S.I. | DSV |
|---|---|---|---|---|---|---|
| 1 | 0 (Control) | 10 | 80 | 42 | 36 | 3.9 |
| 2 | 0.2 | 80 | 78 | 30 | 65 | 3.86 |
| 3 | 0.3 | 80 | 70 | 29 | 65 | 3.75 |
| 4 | 0.4 | 80 | 67 | 28 | 70 | 3.53 |

In each case there is obtained a fluid slurry of somewhat gelatinous polymer particles floating in n-butane. The slurries in each case are discharged into a nitrogen-blanketed vessel containing about 5% by vol., on the slurry, of methanol. The resulting mixture is agitated for a time sufficient to ensure good contact and then a small quantity (5-10%/vol. on the methanol) of water is added and the mixture agitated for a time to ensure extraction of alcohol from the hydrocarbon phase. On standing two layers separate, an upper hydrocarbon layer and a lower aqueous alcohol layer containing catalyst residues. The lower layer is drained off and a volume of water equal to the volume of slurry added thereto, the agitator turned on and the mix agitated to ensure good extraction of the residual alcohol content of the hydrocarbon layer after which the mix is allowed to stand and the lower water layer withdrawn. Two more such clear water washes are given the hydrocarbon layer. There is thus obtained an almost clear, alcohol-free butane slurry of polymer. At this point a solution/dispersion of antioxidant is added containing 0.5 part by weight per 100 parts of rubber (phr.) of "Agerite White" (sym-di-beta-naphthyl-para-phenylenediamine) and 0.25 phr. of "VDH" (diphenyl para-phenylene diamine). An equal volume of water is then added and the butane distilled off at 60-100° C. forming an aqueous slurry of firm, small crumbs essentially free of butane. The slurry is filtered hot (i.e., 50-60° C. or higher) and the filter cake transferred to a wash mill where it is formed into sheets for drying in a vacuum oven. Infrared examination of the four experimental polymers shows them to be better than 90% in cis-1,4 content. The above data shows the relationship between Mooney viscosity (ML) and molecular weight (DSV) to be changed very little by the presence of the amine.

*Example II*

In this example, a commercial antioxidant, "BLE-25," made by condensing diphenyl amine with acetone and containing about 25% unreacted amine is utilized as the activator in the polymerization of isoprene in n-butane (instrument grade treated with molecular sieves) utilizing the catalyst system and procedure, Example I. The materials utilized are as follows:

| Material | Experiment Nos. | | | | |
|---|---|---|---|---|---|
| | 1 | 2 | 3 | 4 | 5 |
| n-Butane, grams | 300 | 300 | 300 | 300 | 300 |
| Isoprene, grams | 60 | 60 | 60 | 60 | 60 |
| Triisobutyl aluminum, ml. | 1.58 | 1.58 | 1.58 | 1.58 | 1.58 |
| TiCl₄, ml | 0.62 | 0.62 | 0.62 | 0.62 | 0.62 |
| Ti/Al Molar Ratio | 0.9:1 | 0.9:1 | 0.9:1 | 0.9:1 | 0.9:1 |
| BLE-25, grams | 0 | 0.64 | 1.28 | 1.92 | 2.56 |
| "BLE-25":C₅, Mol Ratio | | 0.0053 | 0.0106 | 0.0156 | 0.0212 |
| "BLE-25":Al Mol Ratio | | .51 | 1.02 | 1.53 | 2.04 |
| "BLE-25":Ti Mol Ratio | | .57 | 1.114 | 1.71 | 2.28 |
| Ti/Al Mol Ratio | 0.9 | | | | |
| Temp., °C | 1 to 2 | | | | |
| Percent Conversion | 87.6 | 43.4 | 17.5 | 13.8 | 5.5 |
| ML | 87 | 52 | | | |
| Gel, percent | 33 | 7 | 4 | 2 | 10 |
| S.I. | 39 | 129 | 147 | 229 | 133 |
| DSV | 2.96 | 3.60 | 3.47 | 2.98 | 4.21 |

In this example the amine seemed to inhibit quite significantly when more than one mole of the antioxidant per mole of aluminum is utilized. However, this modified diphenylamine shows a strong gel suppressing effect and a pronounced tendency to increase DSV values in spite of its questionable composition and purity. Again, infrared examination shows all the polymers to be better than 90% in cis-1,4 content.

*Example III*

A procedure similar to that utilized in Example I is utilized wherein tri-n-amyl amine is substituted for the tri-n-butyl amine. The recipe utilized is as follows:

| Material | Experiment Nos. | | | | |
|---|---|---|---|---|---|
| | 1 (Control) | 2 | 3 | 4 | 5 |
| n-Butane, grams | 286 | 286 | 286 | 286 | 286 |
| Isoprene, ml | 80 | 80 | 80 | 80 | 80 |
| Triisobutyl aluminum, ml. | 2.25 | 2.25 | 2.25 | 2.25 | 2.25 |
| Ti/Al Molar Ratio | 0.9:1 | 0.9:1 | 0.9:1 | 0.9:1 | 0.9:1 |
| Triamyl amine (TAA), ml. | 0 | 0.1 | 0.2 | 0.4 | 0.8 |
| TiCl₄, ml | 0.88 | 0.88 | 0.88 | 0.88 | 0.88 |
| Moles TAA/mole Al | | 0.036 | 0.072 | 0.144 | 0.288 |
| Percent Conversion (Final) | 75.5 | 89 | 81.5 | 82 | 46.5 |
| ML | 47 | 43 | 37 | 30 | 36 |
| Percent gel | 28 | 23 | 19 | 13 | 12 |
| DSV | 2.95 | 3.07 | 2.96 | 2.80 | 3.05 |

The above data indicate that triamyl amine activates (see higher conversions) and reduces gel. The polymers exhibit an infrared spectrum showing the polymers to be all cis-1,4 polyisoprenes.

Example IV

The procedure of the preceding example is repeated utilizing pure diphenyl amine as the activator-modifier. The proportion of diphenyl amine utilized is 0.0525 mole/mole of titanium. The gel content of a control poyliso-prene is 38% while the amine-modified polyisoprene is only 20%. The corresponding DSV values are 3.32 and 4.61. The experimental reaction started very readily and proceeded quite rapidly during the first few hours. Final conversion (70% for control vs. 50% for the experimental) is lower.

Example V

Triphenyl amine is utilized as the amine in the procedure of the two preceding examples utilizing the following materials:

| | Experiment Nos. | | | | |
|---|---|---|---|---|---|
| | 1 (Control) | 2 | 3 | 4 | 5 |
| Triphenyl amine | 0 | 0.05 | 0.1 | 0.2 | 0.4 |
| Mole/mole Al | | 0.027 | 0.054 | 0.108 | 0.216 |
| Percent Conversion | 88.0 | 84.5 | 89.5 | 89.5 | 91.5 |
| ML | 58 | 61 | 59 | 58 | 64 |
| Percent gel | 27 | 31 | 30 | 32 | 28 |
| DSV | 3.22 | 3.44 | 3.48 | 3.56 | 3.63 |

Even the quite small quantities utilized above show slightly higher rates and slightly higher DSV values.

Example VI

The procedure of Examples III–V is repeated utilizing pyridine as the amine. The results obtained with 0.05 to 0.58 mole of pyridine/mole of titanium show this amine to be a strong gel suppressant.

Example VII

Experiments are conducted by a procedure identical to that of Example I wherein tri-n-butyl amine and an ether are combined. The ether utilized is a non-ionic surfactant known as "Igepal CO-880" which is a condensate of a phenol with ethylene oxide and having a molecular weight of about 1500. The ether and amine are added to the solvent and triisobutyl aluminum and the mix stirred for at least ten minutes before adding the titanium tetrachloride and isoprene monomer. The data are summarized below with the data of Example I repeated for purposes of comparison.

| TBA,[1] phm. | CO-880,[2] phm. | Average Reaction Rate, Percent/hr. | ML | Gel | S.I. | DSV |
|---|---|---|---|---|---|---|
| 0 (Control) | 0 | 10 | 80 | 42 | 36 | 3.9 |
| 0.2 (Control) | 0 | 80 | 78 | 30 | 65 | 3.86 |
| 0.3 (Control) | 0 | 80 | 70 | 29 | 65 | 3.75 |
| 0.4 (Control) | 0 | 80 | 67 | 28 | 70 | 3.53 |
| 0.2 (Control) | 0.5 | 45 | 72 | 15 | 103 | 4.19 |
| 0.5 (Control) | 0.5 | 32 | 77 | 20 | 77 | 4.57 |
| 0.10 (Control) | 0.5 | 36 | 73 | 16 | 94 | 4.41 |
| 0 (Control) | 0.5 | 6.2 | 84 | 22 | 162 | 4.75 |

[1] Tri-n-butyl amine, parts per 100 of monomer.
[2] "Igepal CO-880," parts per 100 of monomer.

These data indicate that the rate activating effects of the amine are sufficient to overcome the rate suppressing effects of the "CO-880" ether modifier. Since the Mooney viscosity did not change appreciably, the significantly higher DSV values indicate that polymers of equivalent plasticity but having materially higher molecular weights are obtained. If a change in structure occurred, it is too small to detect by infrared examination. The polymers are all cis-1,4 polyisoprenes.

Polymerizations carried out as above in a large scale commercial-sized batch reactor indicate that reactions carried out without amine or ether show an induction period of about 1 hour and an average reaction rate of about 10%/hr. With the ether alone, about a four hour induction period is experienced and the average reaction rate thereafter is only 1–2%/hr. With the amine and/or ether, the induction period is at most only a few minutes duration and the average reaction rate is 5 to 80%/hr.

Several other all cis-1,4 polyisoprenes made with amine/ether and ether alone, as modifiers, by a procedure similar to that above. The raw polymer properties of these rubbers are as follows:

| | A 0.5 phm. "Igepal CO-880" | B 0.1 phm. TBA, 0.5 phm. "Igepal CO-880" |
|---|---|---|
| Conversion | 84 | 92 |
| ML at 212° F | 85 | 84 |
| Percent gel | 23 | 22 |
| S.I. | 117 | 162 |
| DSV | 4.92 | 4.73 |

These rubbers and a pale natural crepe control (DSV ca. 9) are compounded as follows:

| | Parts/wt. |
|---|---|
| Rubber | 100 |
| Stearic acid | 3.0 |
| HAF Black | 40.0 |
| ZnO | 5.0 |
| PBNA | 1.0 |
| Benzothiazyl disulfide | 0.6 |
| Sulfur | 3.0 |

NOTE.—National Bureau of Standards Chemicals.

The resulting stocks are mold vulcanized for 30 minutes at 293° F. and the resulting sheets tested for physical properties by ASTM Standard procedures. The data are as follows:

| Room Temperature | Natural Crepe Control | A | B |
|---|---|---|---|
| Tensile, lbs./sq.in | 4,305 | 4,260 | 4,430 |
| 100% modulus | 3,180 | 2,610 | 2,520 |
| Percent Elongation | 510 | 580 | 590 |
| 300% Elongation | 2,160 | 1,710 | 1,650 |
| 212° F. Stress-Strain: | | | |
| Tensile, lbs./sq.in | 3,040 | 2,680 | 2,920 |
| 100% modulus | 1,980 | 1,480 | 1,480 |
| Percent Elongation | 580 | 650 | 700 |
| Hysteresis ΔT° F | 23 | 25 | 27 |
| Percent Compression Set | 7 | 8 | 8 |
| Compounded Mooney (ML-212° F.) | 45 | 43 | 38 |
| $T_5$ | 6 | 7.5 | 7.5 |
| $T_{20}$ | 7.5 | 9 | 9 |
| Durometer Hardness (Cured) | 61 | 60 | 58 |

The above data indicate that the synthetic rubbers were slightly slower curing and, therefore, did not develop as tight a cure. This explains the slightly higher hysteresis, compression set, and elongation values and the lower modulus and 212° F. tensile values. Nevertheless, these physical properties are quite excellent and show clearly that the rubbers are the essential equivalent of the best grade of natural crepe rubber and somewhat better than some of the lower commercial grades of natural rubber. If compounding adjustments are made it is expected that the differences in the above properties would be considerably smaller.

Example VIII

In order to compare the nature of the gel material present in the polymers made by the procedure of the next preceding example, the polymers are milled on a tight (close-spaced rolls) rubber mill in which the rolls are maintained at 158°±9° F. As the milling progresses, samples are removed at 2, 5, 10 and 15 minutes and these are tested for breakdown by determining their Mooney viscosity at 4 minutes (at 212° F.) using the large rotor. By way of comparison, natural (hevea) crepe rubber is similarly milled and tested for rate of breakdown. Also by way of comparison, data obtained on a sample of polyisoprene made without modifier or activator is included. These data are summarized below:

| Time of Milling, min. | Natural Rubber,[1] ml. | Unmodified cis-1,4 polyisoprene,[2] ml. | Ether-modified cis-1,4 polyisoprene,[3] ml. | Amine- and Ether-modified cis-1,4 polyisoprene,[4] ml. |
|---|---|---|---|---|
| 0 | 86 | 80 | 85 | 66 |
| 2 | 68 | 65 | 72 | 57 |
| 5 | 58 | 60 | 59 | 48 |
| 10 | 45 | 58 | 49 | 42 |
| 15 | 33 | 54 | 38 | 35 |

[1] DSV=3.57.
[2] C.A. 40% gel; DSV=3.45.
[3] 0.5% "Igepal CO-880."
[4] 0.5% "Igepal CO-880"+0.1% tri-n-butyl amine.

The above data indicate that the unmodified synthetic cis-1,4 polyisoprene breaks down somewhat more slowly on milling than does natural rubber. The ether-modified synthetic cis-1,4 polyisoprene seems to be essentially the same as natural rubber in its rate of breakdown. The amine-ether modified sample seemed to break down to the same extent even though the original polymer was somewhat softer. The advantage of a rubber which essentially duplicates natural rubber in processing characteristics resides in the fact that rubber processors need make no changes in their processing equipment or procedures when the synthetic product is substituted for the natural.

*Example IX*

In this example, tri-n-butyl amine is utilized with titanium tetrachloride/triisobutyl aluminum catalysts wherein various Ti/Al ratios are maintained. The purpose of these experiments is to determine the optimum catalyst ratio when utilizing amine activation/modification. The proportion of amine is varied at each catalyst ratio in order to determine whether an optimum amine level existed for each ratio. The materials utilized and procedures employed are similar to those given above except that the amine is added to the solvent and then the aluminum compound is added. The data below shows the raw polymer properties [gel, swelling index (S.I.), DSV] and the ratio of optical densities for the 3,4 and 1,4 structures (3,4/1,4 ratio).

| Experiment No. | Ti/Al Ratio | Ti+Al (mM) | Moles Amine/ moles Al | Reaction time, hrs. | Percent Conversion | Percent gel | S.I. | DSV | 3,4/1,4 Ratio |
|---|---|---|---|---|---|---|---|---|---|
| A (Control) | .805/1 | 5.03 | | 5 | 72 | 21 | 45 | 2.942 | .22 |
| B | .805/1 | 5.03 | .193 | 5 | 89 | 5.7 | 40 | 2.896 | .21 |
| C (Control) | .85/1 | 6.09 | | 5 | 83 | 29 | 36 | 2.774 | .20 |
| D | .85/1 | 6.09 | .051 | 5 | 100 | 19 | 64 | 2.967 | .20 |
| E | .85/1 | 4.87 | | 4 | 83 | 31 | 40 | 3.657 | .19 |
| F | .85/1 | 4.87 | .408 | 4 | 95 | 10 | 120 | 3.466 | .22 |
| G | .85/1 | 3.655 | | 1½ | 45 | 30 | 34 | 3.760 | .20 |
| H | .85/1 | 3.655 | .408 | 1½ | 95 | 17 | 102 | 3.861 | .19 |
| I | .885/1 | 5.96 | | 22 | 89 | 45 | 20 | 3.708 | .22 |
| J | .885/1 | 5.96 | .212 | 22 | 100 | 25 | 56 | 3.842 | .21 |
| K | .95/1 | 5.96 | | 5 | 17 | 41 | 15 | 2.129 | .22 |
| L | .95/1 | 5.96 | .19 | 1½ | 89 | 22 | 61 | | .20 |
| M | 1/1 | 5.96 | | 5 | 17 | 56 | 10 | 1.848 | .23 |
| N | 1/1 | 5.96 | .197 | 5 | 100 | 21 | 67 | 2.943 | .24 |
| O | 1.1/1 | 5.96 | | 4 | 2 | | | | |
| P | 1.1/1 | 5.96 | .38 | 4 | 100 | 14 | 95 | 3.286 | .24 |
| Q | 1.3/1 | 5.96 | .25 | 21½ | 78 | 41 | 23 | 3.346 | .24 |

In the above data it will be noted that the tri-n-butyl amine shows increasing activation at the higher catalyst ratios. Ordinarily at ratios above 0.95/1 it is difficult to obtain good yields and the gel contents will be 40–50% or more. When tri-n-hexyl amine and tri-n-heptyl amine are utilized in place of the tri-n-butyl amine closely similar results are obtained.

*Example X*

In this example, N-N-dimethyl aniline is utilized in the process and general procedure of the foregoing examples except that the amine was added to the solvent prior to the aluminum compound. The materials utilized are as follows:

| Material | Experiment A | Experiment B |
|---|---|---|
| n-Butane, parts/wt | 460 | 551 |
| Isoprene, parts/wt | 100 | 100 |
| Triisobutyl aluminum, parts/wt | 2.15 | 3.30 |
| TiCl₄, parts/wt | 2.37 | 2.83 |
| Ti/Al Ratio, parts/wt | 0.885 : 1 | 0.885 : 1 |
| N, N-dimethyl aniline, parts/wt | 0.341 | 0.408 |
| Temp., °C | −5 to 8 | −5 to 8 |
| Percent Conversion | 79.2 | 100 |
| Gel | 29 | 26 |
| S.I. | 68 | 65 |
| DSV | 3.76 | 3.26 |
| ML 4″ at 212° F | 73 | 60 |
| Percent Ash | 0.07 | 0.05 |
| 3,4/1,4 Ratio | 0.22 | 0.24 |
| Time of Reaction, hrs | 5 | 9+ |

In both cases the reaction started promptly with no observable induction period and proceeded smoothly to the high conversions shown. This aniline derivative appears to be a strong activator.

*Example XI*

In this example, triethyl amine is utilized in the polymerization of the isoprene for a 5 hour period utilizing reaction mixtures given below. The Ti/Al ratio is 0.885:1. The recipe and procedure is similar to that of the preceding example. The data are as follows:

| | Experiment No. | | | | | |
|---|---|---|---|---|---|---|
| | A | B | C | D | E | F |
| Mole ET₃N/mole Al | 0 | 0.027 | 0.0434 | .0868 | .1736 | .3472 |
| Percent Conversion | 77.7 | 94.4 | 88.8 | 88.8 | 83.4 | 72.2 |
| Percent gel | 24 | 16 | 12 | 6 | 4.3 | 5.1 |
| S.I. | 46 | 71 | 90 | 84 | 66 | 58 |
| DSV | 2.793 | 2.817 | 2.894 | 2.771 | 2.726 | 2.572 |
| 3,4/1,4 Ratio | 0.20 | 0.19 | 0.22 | 0.19 | 0.19 | 0.19 |
| Observation | All cis-1,4 Structure; no trans-1,4 structure observable. | | | | | |

*Example XII*

The procedure of Example XI is repeated utilizing tri-n-amyl as the amine. The data are as follows:

| | Experiment No. | | | | | |
|---|---|---|---|---|---|---|
| | A | B | C | D | E | F |
| Moles (C₅-H₁₁)₃ N/mole Al | | .0212 | 0.424 | 0.85 | .1696 | .339 |
| Percent Conversion | 77.7 | 88.8 | 77.7 | 77.7 | 72.2 | 66.6 |
| Percent gel | 22 | 18 | 13 | 7.3 | 6.2 | 8.4 |
| S.I. | 47 | 58 | 72 | 66 | 71 | 41 |
| DSV | 2.797 | 3.002 | 2.880 | 3.107 | 2.923 | 2.912 |
| 3,4/1,4 Ratio | 0.21 | 0.22 | 0.23 | 0.23 | 0.21 | 0.21 |
| Observation | (1) | (2) | (2) | (2) | (2) | (2) |

[1] Solid gel.
[2] Loose, v. soft gel.

Example XIII

The procedure of the next preceding examples is repeated utilizing a Ti/Al ratio of 0.85:1 with tri-n-butyl amine as the activator but pre-reacting the amine with the titanium tetrachloride before the mixture is combined with the remaining ingredients. A solution of TiCl$_4$ (ca. 10%) in benzene is combined with the amine under nitrogen and the resulting solution "aged" for about one-half hour before being added to the polymerization vessel. The data are as follows:

|  | Experiment No. | | | | | |
| --- | --- | --- | --- | --- | --- | --- |
|  | A | B | C | D | E | F |
| Moles (i-Bu)$_3$N/ mole Al | | .0255 | .051 | .102 | .204 | .408 |
| Moles (i-Bu)$_3$ N/ mole Ti | | 0.3 | .06 | .12 | .24 | .48 |
| Percent Conversion | 77.7 | 66.6 | 66.6 | 55.5 | 50 | 22.2 |
| Percent gel | 24 | 15 | 11 | 9 | 11.5 | 16 |
| S.I. | 49 | 70 | 63 | 48 | 41 | 14 |
| Observation | | | (¹) | | | |

¹ Loose, watery gel.

The decreasing swelling index and conversion values in the above data indicate that the amine, when pre-reacted with the titanium ingredient, is not functioning in a desirable manner.

A second series of experiments is conducted in which the catalyst is prepared and aged for a while before adding the n-tributyl amine. The procedure is similar to the next preceding examples. Tht data are as follows:

|  | Experiment No. | | | | |
| --- | --- | --- | --- | --- | --- |
|  | H | I | J | K | L |
| N:Al Ratio | 0.0255 | 0.051 | 0.102 | 0.204 | 0.408 |
| Percent Conversion | 44.4 | 44.4 | 44.4 | 22.2 | 22.2 |

The above data indicate that the amine only destroyed active catalyst and retarded the reaction. In this order of addition, the amine is definitely not a modifier.

Example XIV

The procedure of Examples XI–XIII is repeated utilizing the normal procedure with N-methyl diphenyl amine as the amine activator utilizing a Ti/Al ratio of 0.85:1. The data are as follows:

|  | Experiment No. | | | | | |
| --- | --- | --- | --- | --- | --- | --- |
|  | A | B | C | D | E | F |
| Moles amine/mole Al | | .0347 | .052 | .104 | .208 | .416 |
| Moles amine/mole Ti | | .0408 | .0613 | .1226 | .245 | .49 |
| Percent Conversion | 72.3 | 83.4 | 77.7 | 77.7 | 72.3 | 61.2 |
| Percent gel | 11 | 21 | 8 | 7 | 10 | 10 |
| S.I. | 91 | 26 | 66 | 68 | 45 | 53 |
| Observation | | | Strong, rubbery, tacky. | | | |

Example XV

N-methyl-aniline is utilized as an activator in a polymerization of isoprene carried out at −1 to 7° C. The materials utilized are as follows:

| Material | Experiment No. | | | | | |
| --- | --- | --- | --- | --- | --- | --- |
|  | A | B | C | D | E | F |
| Moles N-methyl aniline/mole Al | | 0.058 | 0.116 | 0.174 | 0.232 | 0.464 |
| Isoprene, ml | 14 | 14 | 14 | 14 | 14 | 14 |
| Butane, ml | 85 | 83 | 83 | 87 | 82 | 87 |
| (i-Bu)$_3$Al, mM | 1.58 | 1.58 | 1.58 | 1.58 | 1.58 | 1.58 |
| TiCl$_4$, mM | 1.40 | 1.40 | 1.40 | 1.40 | 1.40 | 1.40 |
| Ti/Al | 0.885/1 | 0.885/1 | 0.885/1 | 0.885/1 | 0.885/1 | 0.885/1 |
| Percent Conversion | 33.3 | 88.8 | 77.7 | 67.7 | 55.5 | 11.1 |
| Percent gel | 43 | 34 | 33 | 19 | 17 | 17 |
| S.I. | 18 | 42 | 39 | 67 | 91 | 34 |
| DSV | 3.075 | 3.627 | 3.694 | 3.142 | 3.883 | 1.607 |
| 3,4/1,4 Ratio | .21 | .21 | .22 | .21 | .25 | .23 |

In the above, pronounced activation and gel reduction is shown for samples B through E along with a strong increase in molecular weight.

Example XVI

For this experiment, butadiene-1.3 is polymerized in a mixed butene-1/benzene diluent containing a titanium tetraiodide/triisobutyl aluminum catalyst. The following materials are charged to a nitrogen-flushed beverage bottle in the order listed:

Material: Parts
- Butene-1 _____ 230 ml.
- Benzene _____ 30 ml.
- Butadiene-1,3 _____ 30 grams.
- Triisobutyl aluminum _____ 0.8 mM.
- Titanium tetraiodide _____ 0.051 mM.
- Tri-n-butylamine _____ 0.1 ml. (0.42 mM.).

The mixture is agitated at room temperature (ca. 75° F.) for about 16 hours. The mixture thickens considerably. After work-up a yield of 60% of a rubbery, tacky polybutadiene are obtained which gives no evidence of containing combined butene.

For a second experiment conducted in the same manner except that the amine is omitted, a yield of only 10% of a very low molecular weight product is obtained in the same time. The two polymers thus obtained are tested by infrared analysis and their DSV is measured. The data are:

|  | Amine-Activated | No Amine |
| --- | --- | --- |
| Infrared: | | |
| cis-1,4, percent | 94 | 92 |
| DSV | 3.1 | 0.9 |

In this case, the rate of reaction is higher, the cis-1,4 content is higher, and the molecular weight is higher with amine showing a strong activating effect for the latter.

We claim:

1. A method for polymerizing monomeric material consisting of isoprene to form a polyisoprene high in molecular weight, low in gel and in which at least 90% of the isoprene units are joined cis-1,4 comprising mixing said monomeric isoprene with a reaction medium consisting of an inert aliphatic hydrocarbon boiling in the range of −10° to 10° C. and an active catalyst prepared by adding to said inert hydrocarbon, in the following order, (1) from about 1 to about 20 gram millimoles of a trialkyl aluminum per liter of said medium, (2) a trialkyl amine in which each alkyl group contains from 2 to 12 carbon atoms, (3) a condensate of an alkyl phenol and ethylene oxide having a molecular weight between 400 and about 1500, and (4) from about 1 to about 20 gram millimoles of titanium tetrachloride per liter of said reaction medium, the said ingredients (1), (2) and (3) being mixed together before addition of said ingredient (4), the said ingredients (1) and (2) being added to said aliphatic hydrocarbon in a molar ratio amine:aluminum between about 0.03:1 and about 0.5:1, the said ingredients (1) and (3) being added to said aliphatic hydrocarbon in a molar ratio condensate:aluminum between 0.001:1 and about 0.3:1, said ingredients (1) and (4) being added to said aliphatic hydrocarbon in a molar ratio titanium:aluminum between about 0.75:1 and 1.1:1, and the said monomeric isoprene constituting between about 5 and 30%/wt. of the total resulting mixture, and carrying out the polymerization of said monomeric isoprene in the said resulting mixture while refluxing said aliphatic hydrocarbon.

2. The method as defined in claim 1 wherein the said amine and said condensate are equilibrated with the said aluminum before contact of the latter with said titanium tetrachloride.

3. The method as defined in claim 1 wherein the said condensate is a condensate of ethylene oxide with a hydroxyl-containing substance, said condensate having a molecular weight above about 400.

References Cited by the Examiner

UNITED STATES PATENTS

| | | | |
|---|---|---|---|
| 2,882,264 | 4/59 | Barnes et al. | 260—94.3 |
| 2,898,329 | 8/59 | Kittleson | 260—94.3 |
| 2,905,659 | 9/59 | Miller et al | 260—94.3 |
| 2,932,633 | 4/60 | Juveland et al. | 260—94.3 |
| 2,977,349 | 3/61 | Brockway et al. | 260—94.3 |

FOREIGN PATENTS

| | | |
|---|---|---|
| 551,851 | 4/57 | Belgium. |
| 554,242 | 5/57 | Belgium. |
| 785,314 | 10/57 | Great Britain. |

JOSEPH L. SCHOFER, *Primary Examiner.*

D. ARNOLD, M. LIEBMAN, LEON J. BERCOVITZ, JAMES A. SEIDLECK, *Examiners.*